United States Patent
Neal, III et al.

(10) Patent No.: US 11,931,920 B2
(45) Date of Patent: Mar. 19, 2024

(54) ADDITIVE CONTROL METHOD UTILIZING SMART REDUNDANT FEEDBACK

(71) Applicant: Halliburton Energy Services, Inc., Houston, TX (US)

(72) Inventors: Charles Neal, III, Oklahoma City, OK (US); Gary Cline, Duncan, OK (US); Derek Abel, Duncan, OK (US); Derek Williams, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 81 days.

(21) Appl. No.: 17/018,766

(22) Filed: Sep. 11, 2020

(65) Prior Publication Data

US 2022/0080618 A1   Mar. 17, 2022

(51) Int. Cl.
*B28C 7/04*   (2006.01)
*E21B 33/14*   (2006.01)

(52) U.S. Cl.
CPC ............ *B28C 7/0418* (2013.01); *E21B 33/14* (2013.01)

(58) Field of Classification Search
CPC ............................ B28C 7/0418; G05D 7/0676
See application file for complete search history.

(56) References Cited

U.S. PATENT DOCUMENTS

2017/0080601 A1* 3/2017 Hernandez ............ B28C 7/0418
2017/0226842 A1   8/2017 Omont et al.
2018/0073346 A1* 3/2018 Urdaneta ................ E21B 33/13
2019/0112910 A1   4/2019 Oehring et al.
2019/0277128 A1   9/2019 Coli et al.
2020/0232290 A1   7/2020 Zazula et al.

FOREIGN PATENT DOCUMENTS

| CN | 107984626 A | 5/2018 |
| CN | 108607377 A | 10/2018 |
| JP | H0938976 A | 2/1997 |

OTHER PUBLICATIONS

International Search Report and Written Opinion issued in related PCT Application No. PCT/US2021/044316 dated Nov. 10, 2021, 15 pages.

* cited by examiner

*Primary Examiner* — Elizabeth Insler
(74) *Attorney, Agent, or Firm* — John Wustenberg; Parker Justiss, P.C.

(57) ABSTRACT

The disclosure provides a method of monitoring a flow rate of a liquid additive comprising measuring the flow rate of the liquid additive with a flow meter; transmitting the measurements of the flow rate to a controller; transmitting, from a variable frequency drive (VFD), measurements of a rotational speed of a motor to the controller, wherein the VFD is coupled to the motor; transmitting measurements from a level sensor to the controller; determining whether the flow rate of the liquid additive is a non-zero rate; utilizing the measurements transmitted to the controller as feedback to compare against a designated set point; calculating an error between the feedback and the designated set point to calculate an updated output; and transmitting the updated output to the VFD to change the flow rate of the liquid additive.

20 Claims, 3 Drawing Sheets

ADDITIVE CONTROL METHOD UTILIZING SMART REDUNDANT FEEDBACK

TECHNICAL FIELD OF THE INVENTION

The present disclosure relates generally to cementing operations and, more particularly, to systems and methods for accurate delivery of liquid additives.

BACKGROUND

As part of some cement mixing operations, a cement supply tank provides liquid additives to the cement mixer. In conventional systems of this type, a flow meter would measure and monitor the flow rate of the liquid additive as it was being supplied to the cement mixer. There can be problems where the flow meter hasn't been calibrated or malfunctions. The missing or faulty feedback from the flow meter to a control system can provide for inaccurate measurements and costly mistakes.

Figure 1:
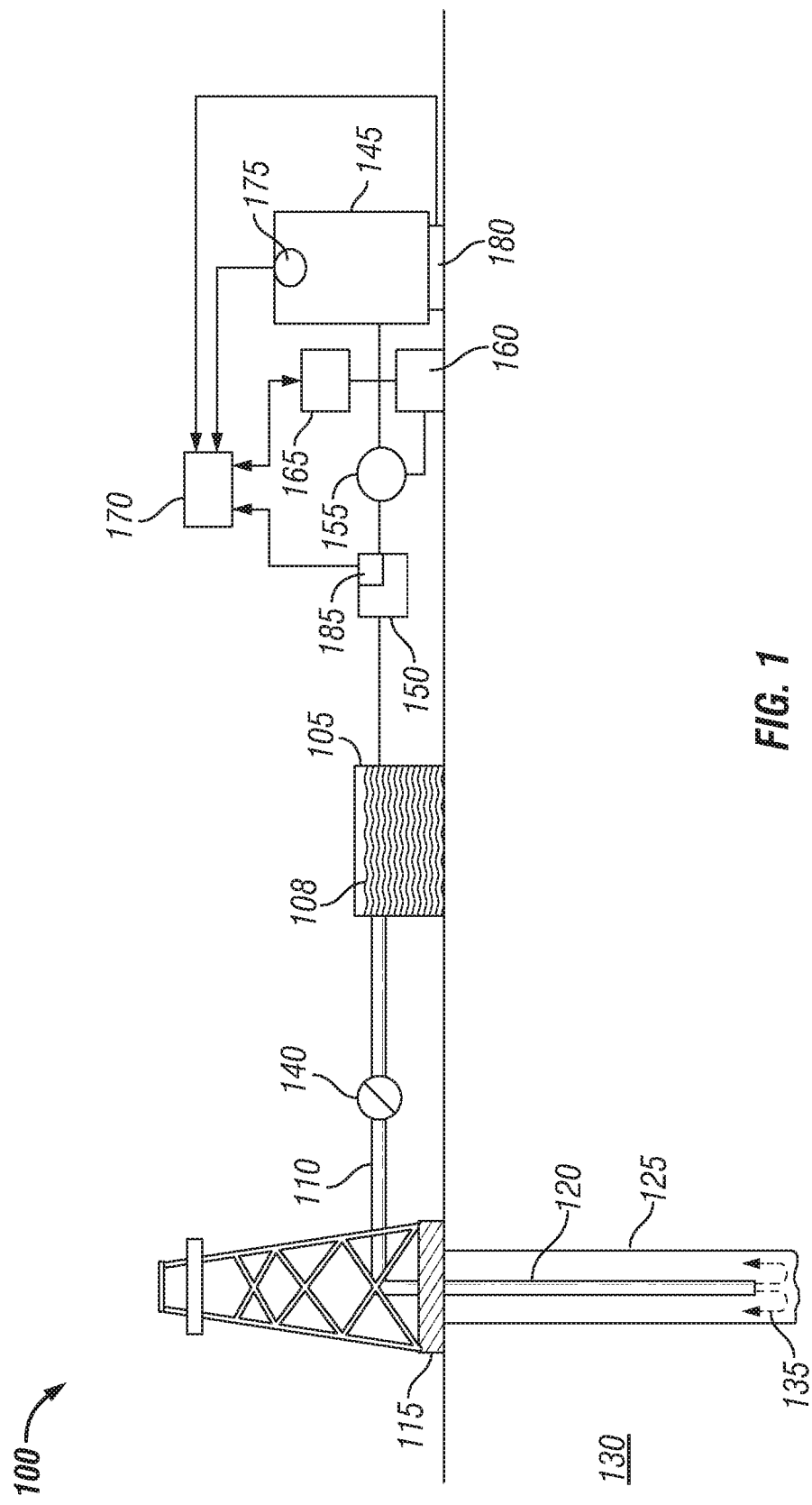
FIG. 1 is a schematic diagram of a system at a well site, according to one or more aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time consuming but would nevertheless be a routine undertaking for those of ordinary skill in the art having the benefit of the present disclosure.

Throughout this disclosure, a reference numeral followed by an alphabetical character refers to a specific instance of an element and the reference numeral alone refers to the element generically or collectively. Thus, as an example (not shown in the drawings), widget "1a" refers to an instance of a widget class, which may be referred to collectively as widgets "1" and any one of which may be referred to generically as a widget "1". In the figures and the description, like numerals are intended to represent like elements.

To facilitate a better understanding of the present disclosure, the following examples of certain embodiments are given. In no way should the following examples be read to limit, or define, the scope of the disclosure. Embodiments described below with respect to one implementation are not intended to be limiting.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

The terms "couple" or "couples," as used herein, are intended to mean either an indirect or direct connection. Thus, if a first device couples to a second device, that connection may be through a direct connection, or through an indirect electrical connection or a shaft coupling via other devices and connections.

The present disclosure provides for systems and methods for monitoring and operating components for accurate delivery of liquid additives for cementing operations. The provided systems and methods may be able to provide a plurality of redundancies for an operator to check and control with an information handling system to mitigate potential problems faced with supplying liquid additives. In one or more embodiments, the disclosed systems and methods provide for an automatic diagnostic feedback loop for operating a motor that drives the flow of the liquid additives.

FIG. 1 shows an illustrative schematic of a system 100 that can deliver cement slurries, according to one or more embodiments. It should be noted that while FIG. 1 generally depicts a land-based system, it is to be recognized that like systems may be operated in subsea locations as well. As depicted in FIG. 1, the system 100 may include a mixing tank 105, in which a cement slurry 108 may be formulated. Again, in one or more embodiments, the mixing tank 105 may represent, or otherwise be replaced with, a transport vehicle, a shipping container or both configured to deliver or otherwise convey the cement slurry 108 to the well site. The cement slurry 108 may be conveyed via a line 110 to a wellhead 115, where the cement slurry 108 enters a tubular 120 (for example, a casing, drill pipe, production tubing, coiled tubing, etc.). The tubular 120 may extend from the wellhead 115 into a wellbore 125 penetrating a subterranean formation 130. Upon being ejected from the tubular 120, the cement slurry 108 may subsequently return up the wellbore 125 in the annulus between the tubular 120 and the wellbore 125 as indicated by flow lines 135. In one or more embodiments, the cement slurry 108 or any other suitable fluid may be reverse pumped down through the annulus and up tubular 120 back to the surface, without departing from the scope of the disclosure. A pump 140 may be configured to raise the pressure of the cement slurry 108 to a desired degree before introduction of the cement slurry 108 into tubular 120 (or the annulus). It is to be recognized that the system 100 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

One skilled in the art, with the benefit of this disclosure, may recognize the changes to the system 100 described in FIG. 1 to provide for other cementing operations (for example, squeeze operations, reverse cementing (where the cement is introduced into an annulus between a tubular and the wellbore and returns to the wellhead through the tubular), and the like).

It is also to be recognized that the cement slurry 108 may also directly, indirectly or both affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (for example, shoes, collars, valves, etc.), wellbore projectiles (for example, wipers, plugs, darts, balls, etc.), logging tools and related telemetry equipment, actuators (for example, electromechanical devices, hydromechanical devices, etc.), sliding sleeves, production sleeves, plugs, screens, filters, flow control devices (for example, inflow control devices, autonomous inflow control devices, outflow control devices, etc.), couplings (for example, electro-hydraulic wet connect, dry connect, inductive coupler, etc.), control lines (for example, electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

As illustrated, the system 100 may further comprise a tank 145, a flow meter 150, a secondary pump 155, a motor 160, a variable frequency drive (VFD) 165, and a controller 170. The tank 145 may be any suitable size, height, shape, and combinations thereof. The tank 145 may be constructed of any suitable materials, including, but not limited to, metals, nonmetals, polymers, composites, and/or combinations thereof. In one or more embodiments, the tank 145 may be configured to store a liquid additive to be used in producing cement slurries (for example, cement slurry 108). As illustrated, the tank 145 may be fluidly coupled to the mixing tank 105. In certain embodiments, there may be a plurality of tanks 145 disposed within the system 100 fluidly coupled to the mixing tank 105 that are configured to store a plurality of liquid additives.

In one or more embodiments, examples of such liquid additives stored in tank 145 may include, but are not limited to, salts, surfactants, acids, retarders, accelerators, dispersants, lost circulation additives, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional $H_2S$ scavengers, $CO_2$ scavengers, oxygen scavengers, lubricants, viscosifying/gelling agents, breakers, weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a crosslinking agent) may be added to the treatment fluid and/or activated after the viscosifying agent has been at least partially hydrated in the fluid. A person skilled in the art, with the benefit of this disclosure, will recognize the types of additives that may be included in the fluids of the present disclosure for a particular application.

In one or more embodiments, a level sensor 175 may be disposed on the tank 145. Without limitations, the level sensor 175 may be disposed about any suitable location on the tank 145. The level sensor 175 may be disposed on top of the tank 145 and configured to measure the height of the liquid additive within the tank 145. In one or more embodiments, the level sensor 175 may be any suitable sensor, such as a radar sensor. In embodiments, the level sensor 175 may operate to provide continuous measurements of the height of the liquid additive. In one or more embodiments, a weight scale 180 may further be disposed in the system 100, wherein the tank 145 may be disposed on top of the weight scale 180. The weight scale 180 may be configured to measure weight of the additive in the tank 145 to determine a rate of weight loss of the additive leaving the tank 145 during operations. In one or more embodiments, the level sensor 175 and/or the weight scale 180 may be configured to transmit measurements to the controller 170. In embodiments, transmission may occur via a connection that is wired, wireless, and combinations thereof. In embodiments, the level sensor 175 and/or the weight scale 180 may be used to determine a rate at which the liquid additive is flowing out of the tank 145.

In one or more embodiments, the flow meter 150 may be disposed downstream of the tank 145. Without limitations, any suitable type of flow meter may be used as the flow meter 150. During operations, the flow meter 150 may be configured to measure a flow rate of a fluid. In one or more embodiments, the flow rate to be measure by the flow meter 150 may be that of the liquid additive contained in the tank 145. As illustrated, the flow meter 150 may comprise a transmitter 185. The transmitter 185 may be configured to transmit measurements from the flow meter 150 to the controller 170. In one or more embodiments, transmission may occur via a connection that is wired, wireless, and combinations thereof. In one or more embodiments, the secondary pump 155 may be disposed between the flow meter 150 and the tank 145, where the secondary pump 155 may be configured to pump or displace the liquid additive from the tank 145 to the mixing tank 105. As illustrated, the motor 160 may be coupled to the secondary pump 155 and configured to actuate the secondary pump 155.

Without limitations, any suitable pump and motor may be used as the secondary pump 155 and the motor 160, respectively. In further embodiments, the VFD 165 may be coupled to the motor 160 and may be configured to control the operation of the motor 160 by varying the frequency and voltage of the supplied power, which may affect operation of the secondary pump 155. In one or more embodiments, a tachometer (not shown) may be used rather than the VFD 165. In one or more embodiments, the tachometer may be used in conjunction with the VFD 165 to measure the speed of the motor 160. The VFD 165 may be communicatively coupled to the controller 170. In one or more embodiments, the controller 170 may transmit instructions to the VFD 165, and the VFD 165 may transmit measurements (for example, rotational speed of the motor 160) to the controller 170. In one or more embodiments, transmission may occur via a connection that is wired, wireless, and combinations thereof.

In one or more embodiments, the controller 170 may be disposed about any suitable location in the system 100. In alternate embodiments, controller 170 may be located remotely from the system 100. Without limitations, the controller 170 may be any suitable controller. In one or more embodiments, controller 170 may be directly or indirectly coupled to any one or more components of the system 100. During operations, the controller 170 may be configured to monitor and operate the system 100 by sending signals to the VFD 165 to actuate the motor 160 to operate, thereby affecting the flow rate of the liquid additive being pumped to the mixing tank 105. In embodiments, the controller 170 may transmit set points for the speed of the motor 160 in order to control the flow rate of the liquid additive. In one or more embodiments, the liquid additive may be pumped to the mixing tank 105, injected into a mixed slurry (for example, cement slurry 108) as it is pumped down the wellbore 125 or as it is contained within a displacement tank prior to being pumped down the wellbore 125, and any combinations thereof.

Figure 2:
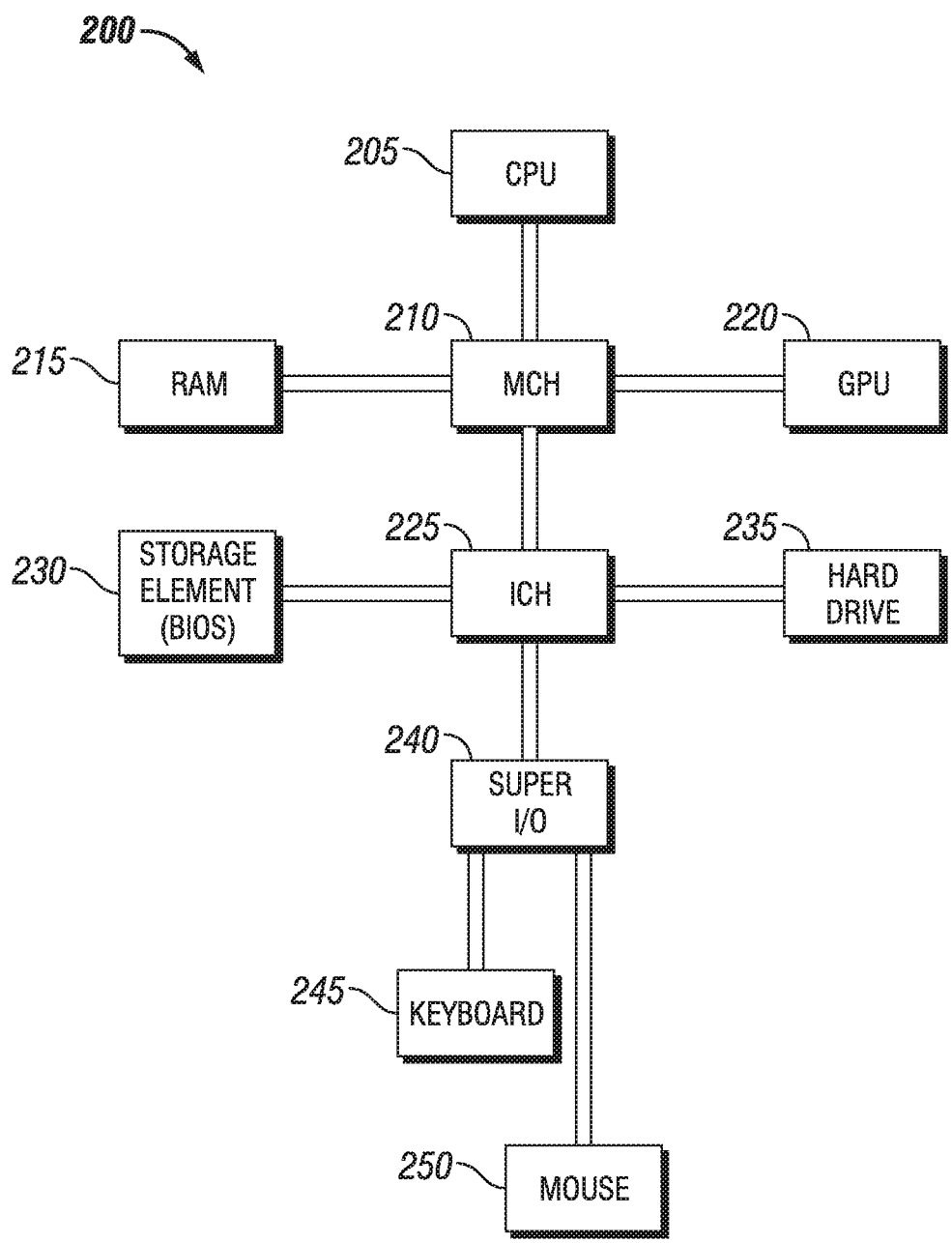
FIG. 2 is a diagram illustrating an example information handling system, according to aspects of the present disclosure.

FIG. 2 is a diagram illustrating an example information handling system 200, according to aspects of the present disclosure. The controller 170 (referring to FIG. 1) may take a form similar to the information handling system 200 or include one or more components of information handling system 200. A processor or central processing unit (CPU) 205 of the information handling system 200 is communicatively coupled to a memory controller hub or north bridge 210. The processor 205 may include, for example a microprocessor, microcontroller, digital signal processor (DSP), application specific integrated circuit (ASIC), or any other digital or analog circuitry configured to interpret and/or execute program instructions and/or process data. Processor 205 may be configured to interpret and/or execute program instructions or other data retrieved and stored in any memory such as memory 215 or hard drive 235. Program instructions or other data may constitute portions of a software or application for carrying out one or more methods described herein. Memory 215 may include read-only memory (ROM), random access memory (RAM), solid state memory, or disk-based memory. Each memory module may include any system, device or apparatus configured to retain program instructions and/or data for a period of time (e.g., computer-readable non-transitory media). For example, instructions from a software or application may be retrieved and stored in memory 215 for execution by processor 205.

Modifications, additions, or omissions may be made to FIG. 2 without departing from the scope of the present disclosure. For example, FIG. 2 shows a particular configuration of components of information handling system 200. However, any suitable configurations of components may be used. For example, components of information handling system 200 may be implemented either as physical or logical components. Furthermore, in some embodiments, functionality associated with components of information handling system 200 may be implemented in special purpose circuits or components. In other embodiments, functionality associated with components of information handling system 200 may be implemented in configurable general-purpose circuit or components. For example, components of information handling system 200 may be implemented by configured computer program instructions.

Memory controller hub (MCH) 210 may include a memory controller for directing information to or from various system memory components within the information handling system 200, such as memory 215, storage element 230, and hard drive 235. The memory controller hub 210 may be coupled to memory 215 and a graphics processing unit (GPU) 220. Memory controller hub 210 may also be coupled to an I/O controller hub (ICH) or south bridge 225. I/O controller hub 225 is coupled to storage elements of the information handling system 200, including a storage element 230, which may comprise a flash ROM that includes a basic input/output system (BIOS) of the computer system. I/O controller hub 225 is also coupled to the hard drive 235 of the information handling system 200. I/O controller hub 225 may also be coupled to a Super I/O chip 240, which is itself coupled to several of the I/O ports of the computer system, including keyboard 245 and mouse 250.

In certain embodiments, the controller 170 may comprise an information handling system 200 with at least a processor and a memory device coupled to the processor that contains a set of instructions that when executed cause the processor to perform certain actions. In any embodiment, the information handling system may include a non-transitory computer readable medium that stores one or more instructions where the one or more instructions when executed cause the processor to perform certain actions. As used herein, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a computer terminal, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system 200 may also include one or more buses operable to transmit communications between the various hardware components.

Figure 3:
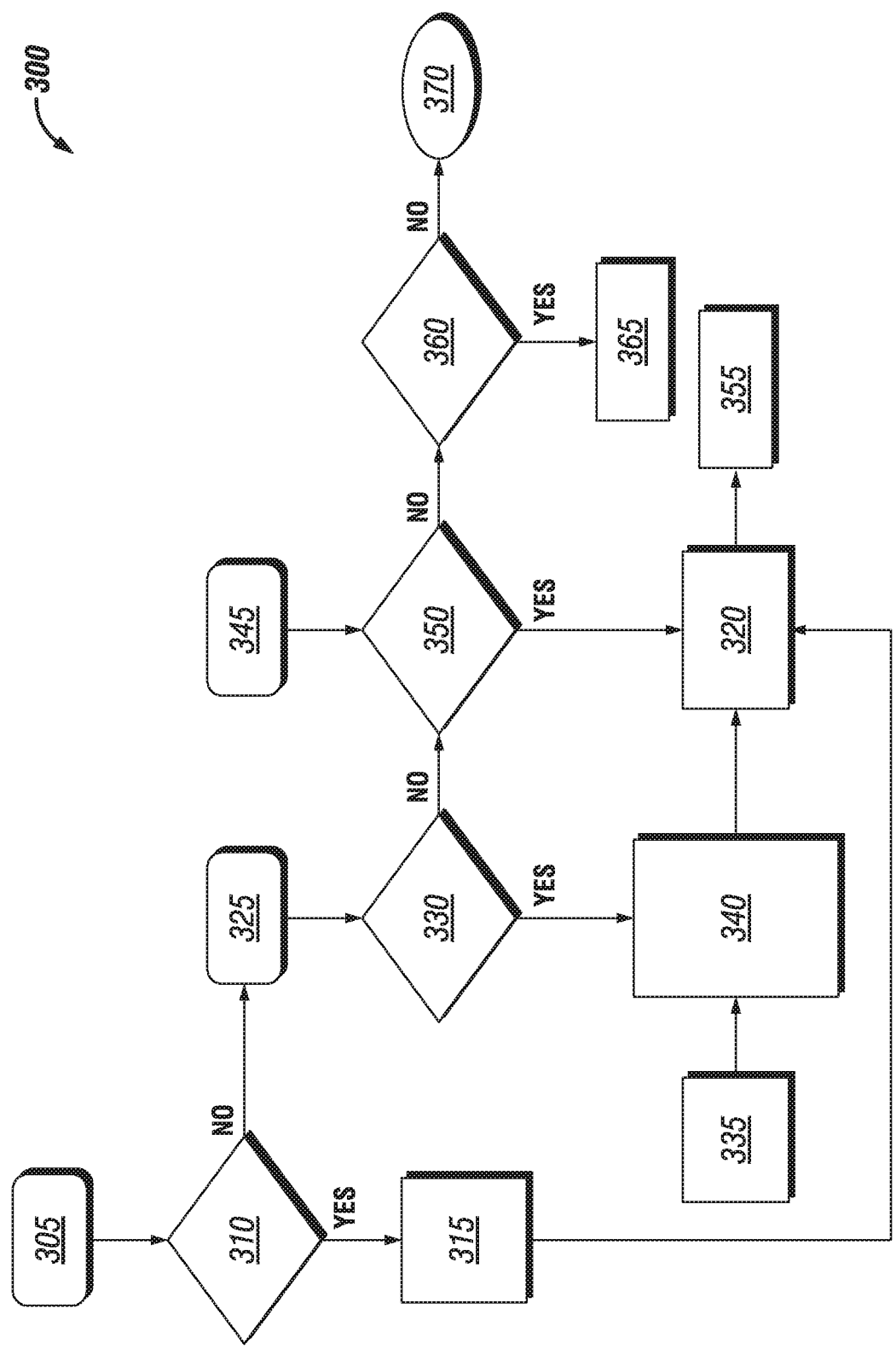
FIG. 3 is a diagram illustrating a method of operating the system of FIG. 1, according to aspects of the present disclosure.

FIG. 3 illustrates a flowchart describing a methodology 300 of operations with the system 100 (referring to FIG. 1). At a step 305, the flow meter 150 (referring to FIG. 1) may measure a flow rate of the liquid additive flowing from the tank 145 (referring to FIG. 1) to the mixing tank 105 (referring to FIG. 1). Without limitations, the flow meter 150 may operate to collect measurements at any suitable frequency and/or amount of time. In one or more embodiments, the transmitter 185 (referring to FIG. 1) may transmit the measurements of the flow rate to the controller 170 (referring to FIG. 1). Once the controller 170 has received the measurements from the flow meter 150, the controller 170 may store, process, display, manipulate, and combinations thereof the measurements for further operations monitored by an operator. At a step 310, the controller 170 may determine whether or not the flow rate of the flowing liquid additive is a non-zero rate.

If the flow rate of the flowing liquid additive is a non-zero rate, then the controller 170 may utilize the measurements from the flow meter 150 as feedback during operation of the motor 160 (referring to FIG. 1) at a step 315. In embodiments, the methodology 300 may proceed to a step 320 where the controller 170 may compare the feedback from the flow meter 150 to a designated set point. In one or more embodiments, an operator may input the designated set point into the controller 170 at any suitable time in relation to operation of the system 100. In embodiments, the designated set point may be an optimal flow rate of the liquid additive. Without limitations, the designated set point may be selected from a range of about 0 gpm to about 50 gpm. During step 320, the controller 170 may be configured to calculate an error between the feedback and the designated set point and may calculate an updated output to be communicated to the VFD 165 (referring to FIG. 1) to reduce the error. In one or more embodiments, the updated output may be the rotational speed at which the motor 160 operates, which affects the flow rate of the liquid additive. In one or more embodiments, the error may be reduced by instructing the VFD 165 to actuate the motor 160 to increase or decrease its rotational speed. In one or more embodiments, the error may be reduced to zero. In alternate embodiments, the error may be reduced to within an acceptable tolerance of zero determined by the operator.

If the flow rate of the flowing liquid additive is not a non-zero rate, the controller 170 may alert the operator by displaying a warning/alarm on a display indicating possible failures such as, but not limited to, the secondary pump 155 being stuck or disengaged, a technical issue with the flow meter 150, a valve (not shown) coupled to the tank 145 may be closed, and any combinations thereof. In these embodiments, the methodology 300 may then proceed from step 310 to a step 325, where the VFD 165 may transmit measurements of the rotational speed of the motor 160, torque, current, output frequency and voltage of the supplied power, diagnostic data, and any combinations thereof from the VFD 165 to the controller 170. In one or more embodiments, once the controller 170 has received the measurements from the VFD 165, the controller 170 may store, process, display, manipulate, and combinations thereof the measurements for further operations monitored by the operator, such as, but not limited to, determining the flow rate of the liquid additive.

At a step 330, the controller 170 may determine whether or not the flow rate of the flowing liquid additive is a non-zero rate based, at least in part, on the measurements provided by the VFD 165. In these embodiments, the controller 170 may be configured to determine the flow rate based, at least in part, on the received measurements from the VFD 165 of the rotational speed of the motor 160. If the rotational speed is a non-zero value, then the controller 170 may assume that there is at least some flow of liquid additive as the motor 160 is operating, and the methodology 300 may proceed to a step 335. If the rotational speed is not a non-zero value, then the controller 170 may assume that there is no flow of liquid additive as the motor 160 is not running, and the methodology 300 may proceed to a step 345. In these embodiments where there is an indication of the flow rate being zero, the controller 170 may alert the operator by displaying a warning/alarm on a display indicating possible failures such as, but not limited to, the secondary pump 155 being stuck or disengaged.

In both steps 335 and 345, a flow rate of the liquid additive may be calculated based, at least in part, on the rate at which the liquid additive contained in the tank 145 decreases. In one or more embodiments, the rate at which the liquid additive contained in the tank 145 decreases may be determined with measurements from the level sensor 175 (referring to FIG. 1) and/or the weight scale 180 (referring to FIG. 1). In embodiments, the level sensor 175 may measure the height of the liquid additive within the tank 145. In one or more embodiments, the level sensor 175 may operate to collect measurements at any suitable frequency and/or amount of time, wherein the level sensor 175 may be configured to measure a rate at which the height of the liquid additive changes. In embodiments where the tank 145 comprises a uniform width and a conventional shape, the controller 170 may be configured to determine the flow rate of the liquid additive by multiplying the rate at which the height of the liquid additive is changing with the volume of liquid additive per unit of length. In embodiments where the tank 145 comprises a varying width and/or an unconventional shape, the volume of liquid additive per unit of length may be determined by utilizing a tank strap algorithm and/or chart, wherein the controller 170 may interpolate between designated values if the measurement from the level sensor 175 does not match any of the designated values. In these embodiments, the controller 170 may then determine the flow rate of the liquid additive by multiplying the rate at which the height of the liquid additive is changing with the determined volume of liquid additive per unit of length.

In one or more embodiments, the weight scale 180 may be used in conjunction with or in the alternative of the level sensor 175. In embodiments, the weight scale 180 may measure the weight of the liquid additive within the tank 145 in addition to the weight of the tank 145. In one or more embodiments, the weight scale 180 may operate to collect measurements at any suitable frequency and/or amount of time, wherein the weight scale 180 may be configured to measure a rate of the reduction in weight of the liquid additive. In embodiments, the controller 170 may be configured to determine the flow rate of the liquid additive by dividing the difference of the weight of an empty tank from a full tank by the weight per volume of the fluid additive. In one or more embodiments, the operator may input the specifications regarding the particular liquid additive.

With reference back to step 330, if the rotational speed calculated by the controller 170 is a non-zero value, the step 335 may be implemented to proceed to a step 340. At step 340, the controller 170 may compare the flow rate determined, at least in part, by the measurements from the VFD 165 from step 325 to the flow rate determined, at least in part by the measurements from the level sensor 175 and/or the weight scale 180 from step 335. In one or more embodiments, the controller 170 may select the flow rate that is closest in comparison to the designated set point at which the operator wants the system 100 to operate for monitoring and for further use with the controller 170. After the appropriate flow rate is selected, the methodology may proceed to step 320.

If the rotational speed calculated by the controller 170 is not a non-zero value, the step 345 may be implemented to proceed to a step 350. At step 350, the controller 170 may determine whether or not the flow rate determined, at least in part, by the level sensor 175 and/or the weight scale 180 is a non-zero rate. If the flow rate of the flowing liquid additive is a non-zero rate, then the methodology may proceed to step 320. Once the updated output to be communicated to the VFD 165 to reduce the error is calculated by the controller 170 in step 320, the methodology 300 may proceed to a step 355. Step 355 may comprise of transmitting the updated output to the VFD 165 from the controller 170 and actuating the VFD 165 in accordance with the updated output, where the flow rate of the liquid additive may be affected as the operation of the motor 160 and the secondary pump 155 may change in relation to the change in operation of the VFD 165.

If the flow rate of the flowing liquid additive is not a non-zero rate, then the methodology may proceed to a step 360. At step 360, the controller 170 may determine whether or not a previous iteration of the updated output to be communicated to the VFD 165 to reduce the error is greater than zero. If the previous iteration of the updated output is greater than zero, the methodology 300 may proceed to a step 365. In one or more embodiments, step 365 may comprise of alerting the operator that the secondary pump 155 may not be working properly. Step 365 may further comprise of terminating operations and shutting down at least a portion of the components within the system 100. If the previous iteration of the updated output is not greater than zero, the methodology 300 may proceed to a step 370. In one or more embodiments, step 370 may comprise of alerting the operator that the designated set point is set to zero, there is a connection problem where feedback is not being received by the controller 170, and any combinations thereof.

In one or more embodiments, the controller 170 may periodically alert the operator through a display of any potential issues with the components within the system 100. Without limitations, these issues may include the secondary pump 155 not operating, the VFD 165 not properly calibrated, the valve to the tank 145 is closed, the VFD 165, level sensor 175, or the weight sensor 180 being defective, feedback not being input into the controller 170. In one or more embodiments, the controller 170 may automatically switch the source (for example, the flow meter 150, VFD 165, level sensor 175, or weight scale 180) at which the flow rate is being monitored to the source that, at least in part, determines the flow rate closest to the designated set point. In other embodiments, the operator may manually switch between sources to select the source that, at least in part, determines the flow rate closest to the designated set point. In one or more embodiments, the controller 170 may use a triple or quadruple redundancy monitoring system with diagnostic feedback. In one or more embodiments, the system 100 may reduce the amount of non-productive time and in determining any potential problems with a particular source of measurements.

An embodiment of the present disclosure is a method of monitoring a flow rate of a liquid additive comprising measuring the flow rate of the liquid additive with a flow meter; transmitting the measurements of the flow rate to a controller; transmitting, from a variable frequency drive (VFD), measurements of a rotational speed of a motor to the controller, wherein the VFD is coupled to the motor; transmitting measurements from a level sensor to the controller; determining whether the flow rate of the liquid additive is a non-zero rate; utilizing the measurements transmitted to the controller as feedback to compare against a designated set point; calculating an error between the feedback and the designated set point to calculate an updated output; and transmitting the updated output to the VFD to change the flow rate of the liquid additive.

In one or more embodiments described in the preceding paragraph, wherein the designated set point is an optimal flow rate of the liquid additive selected from a range of about 0 gpm to about 50 gpm. In one or more embodiments described above, further comprising actuating the level sensor to measure the height of the liquid additive within the tank, wherein the level sensor is disposed on top of the tank. In one or more embodiments described above, wherein the controller is configured to determine a rate at which the liquid additive is flowing out of the tank based, at least in part, on the measurements of the height of the liquid additive within the tank. In one or more embodiments described above, wherein determining the rate at which the liquid additive is flowing out of the tank comprises multiplying the rate at which the height of the liquid additive within the tank is changing with the volume of liquid additive per unit of length. In one or more embodiments described above, wherein the volume of liquid additive per unit of length is determined by utilizing a tank strap algorithm or chart. In one or more embodiments described above, further comprising actuating the motor to increase or decrease in rotational speed based, at least in part, on the updated output. In one or more embodiments described above, further comprising displaying an alert on a display indicating possible failures selected from the group consisting of a secondary pump being stuck or disengaged, a technical issue with the flow meter, a valve coupled to the tank is closed, the designated set point is set to zero, there is a connection problem where feedback is not being received by the controller, and any combinations thereof. In one or more embodiments described above, wherein determining whether the flow rate of the liquid additive is a non-zero rate comprises determining whether the rotational speed is a non-zero value. In one or more embodiments described above, further comprising selecting a source selected from the group consisting of the flow meter, the VFD, and the level sensor that transmits measurements closest in comparison to the designated set point.

Another embodiment of the present disclosure is a method of monitoring a flow rate of a liquid additive comprising measuring the flow rate of the liquid additive with a flow meter; transmitting the measurements of the flow rate to a controller; transmitting, from a variable frequency drive (VFD), measurements of a rotational speed of a motor to the controller, wherein the VFD is coupled to the motor; transmitting measurements from a weight scale to the controller; determining whether the flow rate of the liquid additive is a non-zero rate; utilizing the measurements transmitted to the controller as feedback to compare against a designated set point; calculating an error between the feedback and the designated set point to calculate an updated output; and transmitting the updated output to the VFD to change the flow rate of the liquid additive.

In one or more embodiments described in the preceding paragraph, further comprising actuating the weight scale to measure the weight of the liquid additive within the tank and the weight of the tank, wherein the tank is disposed on top of the weight scale. In one or more embodiments described above, wherein the controller is configured to determine a rate at which the liquid additive is flowing out of the tank based, at least in part, on the measurements of the weight of the liquid additive within the tank. In one or more embodiments described above, wherein determining the rate at which the liquid additive is flowing out of the tank comprises dividing the difference of the weight of the tank being empty from the tank being filled with liquid additive by the weight per volume of the liquid additive. In one or more embodiments described above, further comprising transmitting measurements from a level sensor to the controller, wherein the level sensor is disposed on top of the tank. In one or more embodiments described above, further comprising selecting a source, with the controller, selected from the group consisting of the flow meter, the VFD, the weight sensor, and the level sensor that transmits measurements closest in comparison to the designated set point. In one or more embodiments described above, further comprising actuating the motor to increase or decrease in rotational speed based, at least in part, on the updated output. In one or more embodiments described above, wherein determining whether the flow rate of the liquid additive is a non-zero rate comprises determining whether the rotational speed is a non-zero value. In one or more embodiments described above, wherein the designated set point is an optimal flow rate of the liquid additive selected from a range of about 0 gpm to about 50 gpm. In one or more embodiments described above, further comprising displaying an alert on a display indicating possible failures selected from the group consisting of a secondary pump being stuck or disengaged, a technical issue with the flow meter, a valve is closed, the designated set point is set to zero, a connection problem where feedback is not received by the controller, and combinations thereof.

Unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method of monitoring a flow rate of a liquid additive pumped to a mixing tank, comprising:
   measuring the flow rate of the liquid additive pumped to the mixing tank with a flow meter;
   transmitting the measurements of the flow rate of the liquid additive pumped to the mixing tank to a controller; and
   transmitting, from a variable frequency drive (VFD), measurements of a rotational speed of a motor to the controller, wherein the VFD is coupled to the motor and the motor drives a pump which pumps the liquid additive to the mixing tank; wherein:
   when the measurements of the flow rate of the liquid additive from the flow meter are non-zero:
      utilizing the measurements transmitted to the controller from the flow meter as feedback to compare against a designated set point;
      calculating an error between the feedback and the designated set point to calculate an updated output; and
      transmitting the updated output to the VFD to change the flow rate of the liquid additive; and
   when the measurements of the flow rate of the liquid additive are not non-zero:
      transmitting measurements from a level sensor to the controller, wherein the level sensor measures a level of the liquid additive in a storage tank;
      determining whether the flow rate of the liquid additive pumped to the mixing tank is a non-zero rate based on the rotational speed measurements, and the level sensor measurements, wherein all of the measurements are made at a same time;
      utilizing the measurements transmitted to the controller as feedback to compare against a designated set point;
      calculating an error between the feedback and the designated set point to calculate an updated output; and
      transmitting the updated output to the VFD to change the flow rate of the liquid additive.

2. The method of claim 1, wherein the designated set point is an optimal flow rate of the liquid additive selected from a range of about 0 gpm to about 50 gpm.

3. The method of claim 1, further comprising actuating the level sensor to measure the height of the liquid additive within the storage tank, wherein the level sensor is disposed on top of the storage tank.

4. The method of claim 3, wherein the controller is configured to determine a rate at which the liquid additive is flowing out of the storage tank based, at least in part, on the measurements of the height of the liquid additive within the storage tank.

5. The method of claim 4, wherein determining the rate at which the liquid additive is flowing out of the storage tank comprises multiplying the rate at which the height of the liquid additive within the storage tank is changing with the volume of liquid additive per unit of length.

6. The method of claim 5, wherein the volume of liquid additive per unit of length is determined by utilizing a tank strap algorithm or chart.

7. The method of claim 1, further comprising actuating the motor to increase or decrease in rotational speed based, at least in part, on the updated output.

8. The method of claim 1, further comprising displaying an alert on a display indicating possible failures selected from the group consisting of a secondary pump being stuck or disengaged, a technical issue with the flow meter, a valve coupled to a tank is closed, the designated set point is set to zero, there is a connection problem where feedback is not being received by the controller, and any combinations thereof.

9. The method of claim 1, wherein determining whether the flow rate of the liquid additive is a non-zero rate comprises determining whether the rotational speed is a non-zero value.

10. The method of claim 1, further comprising selecting a source selected from the group consisting of the flow meter, the VFD, and the level sensor that transmits measurements closest in comparison to the designated set point.

11. A method of monitoring a flow rate of a liquid additive pumped to a mixing tank, comprising:
measuring the flow rate of the liquid additive pumped to the mixing tank with a flow meter;
transmitting the measurements of the flow rate of the liquid additive pumped to the mixing tank to a controller; and
transmitting, from a variable frequency drive (VFD), measurements of a rotational speed of a motor to the controller, wherein the VFD is coupled to the motor and the motor drives a pump which pumps the liquid additive to the mixing tank; wherein:
when the measurements of the flow rate of the liquid additive from the flow meter are non-zero:
utilizing the measurements transmitted to the controller from the flow meter as feedback to compare against a designated set point;
calculating an error between the feedback and the designated set point to calculate an updated output; and
transmitting the updated output to the VFD to change the flow rate of the liquid additive; and
when the measurements of the flow rate of the liquid additive are not non-zero:
transmitting measurements from a weight scale to the controller, wherein the weight scale measures a weight of the liquid additive in a storage tank;
determining whether the flow rate of the liquid additive pumped to the mixing tank is a non-zero rate based on the rotational speed measurements, and the weight scale measurements, wherein all of the measurements are made at a same time;
utilizing the measurements transmitted to the controller as feedback to compare against a designated set point;
calculating an error between the feedback and the designated set point to calculate an updated output; and
transmitting the updated output to the VFD to change the flow rate of the liquid additive.

12. The method of claim 11, further comprising actuating the weight scale to measure the weight of the liquid additive within the storage tank and the weight of storage tank, wherein the storage tank is disposed on top of the weight scale.

13. The method of claim 12, wherein the controller is configured to determine a rate at which the liquid additive is flowing out of the storage tank based, at least in part, on the measurements of the weight of the liquid additive within the storage tank.

14. The method of claim 13, wherein determining the rate at which the liquid additive is flowing out of the storage tank comprises dividing the difference of the weight of the storage tank being empty from the storage tank being filled with liquid additive by the weight per volume of the liquid additive.

15. The method of claim 11, further comprising transmitting measurements from a level sensor to the controller, wherein the level sensor is disposed on top of the storage tank.

16. The method of claim 15, further comprising selecting a source, with the controller, selected from the group consisting of the flow meter, the VFD, the weight sensor, and the level sensor that transmits measurements closest in comparison to the designated set point.

17. The method of claim 11, further comprising actuating the motor to increase or decrease in rotational speed based, at least in part, on the updated output.

18. The method of claim 11, wherein determining whether the flow rate of the liquid additive is a non-zero rate comprises determining whether the rotational speed is a non-zero value.

19. The method of claim 11, wherein the designated set point is an optimal flow rate of the liquid additive selected from a range of about 0 gpm to about 50 gpm.

20. The method of claim 11, further comprising displaying an alert on a display indicating possible failures selected from the group consisting of a secondary pump being stuck or disengaged, a technical issue with the flow meter, a valve coupled to the tank is closed, the designated set point is set to zero, there is a connection problem where feedback is not being received by the controller, and any combinations thereof.

* * * * *